March 15, 1960 H. R. DAY, JR 2,928,895
METHOD FOR RECORDING TELEVISION PICTURES ON MOTION PICTURE FILM
Filed Dec. 22, 1955 2 Sheets-Sheet 1

Inventor:
Harold R. Day Jr.,
by Paul A. Frank
His Attorney.

METHOD FOR RECORDING TELEVISION PICTURES ON MOTION PICTURE FILM

Filed Dec. 22, 1955

Inventor:
Harold R. Day Jr.,
by Paul A. Frank
His Attorney.

United States Patent Office 2,928,895

Patented Mar. 15, 1960

2,928,895

METHOD FOR RECORDING TELEVISION PICTURES ON MOTION PICTURE FILM

Harold R. Day, Jr., Ballston Lake, N.Y., assignor to General Electric Company, a corporation of New York Application December 22, 1955, Serial No. 554,845

5 Claims. (Cl. 178—7.4)

This invention relates to an improved method for recording television pictures on motion picture film, and, more particularly, to accomplishing such recording using standard, relatively inexpensive photographic camera and television receiver equipment without extensive modification. A television receiver, as contemplated herein, may be either a remote receiver responsive to broadcast signals or a local monitor directly coupled to the television camera.

Motion picture photography of television pictures is required whenever a permanent record of a television program is to be made. The record may be for use only as a record or it may be for purposes of remote and delayed presentations of a given television program. Making such a record is, however, complicated by the different frame frequencies standardized for television and for cinematography.

Television pictures are presented at a rate depending upon and commensurable with the electric power frequency, 60 cycles per second in the United States. Consequently, television frames comprising two interlaced scans or fields are timed at a frame frequency of 30 frames per second, equivalent to 60 fields per second. On the other hand, the almost universal standard frequency for cinematography is 24 frames per second.

In the motion picture camera the film is moved intermittently into position for exposure at a frame rate of 24 frames per second. Part of the $\frac{1}{24}$ second time per frame is devoted to exposure of the film and for the remainder of the period the exposure is cut off while the next frame is moved or "pulled down" into position. In a standard camera the pulldown time is approximately $\frac{1}{70}$ second. Although the pulldown time may be decreased, it is only at the expense of a more complicated mechanism, and such limiting factors as inertia of the system and attrition of the film due to rapid acceleration and deceleration make this very difficult.

Since the expense involved obviates the use of a specially constructed cinematographic system operating at a non-standard frame frequency, various attempts have been made to rationalize the present standard frequencies by modification of existing equipment. The approach has been to expose each film frame to superimposed television images including a latter part of the scan of one field, the whole of the scan of the next field, and then a part of the scan of a third field, the timing being such that the sum of the two fractional parts is just equal to one full scan. This results in a splice at the juncture of the image of the two partial scans, a discontinuity which is objectionable unless exposure control is exact.

Synchronism of the camera operation with the presentation of the television pictures must be extremely precise in such systems because of the manner in which the television picture is presented. A television frame is composed of two interlaced scans, each individual scan comprising half of the total of 525 scanning lines per frame. The first field is made up of the odd lines, the second field of the even lines, and when shown in rapid succession the two complementary fields appear to be a single frame due to the persistence of vision.

Since the television picture is progressively swept onto the field as the cathode ray spot progresses down the length of each frame, a variation in the exposure time of the film will not result in an over or under exposure of a whole frame, but rather there will be lack of exposure or a multiple exposure of certain parts of the film frame. If the exposure is to slightly more than an integral number of television fields, a lateral area of the film frame in the region of the overlap of the partial scans will be overexposed. If exposure is to somewhat less than an integral number of television fields, the portion of the frame not exposed to the partial scans will be underexposed. The resulting light and dark areas, known as "shutter bars," will move vertically through the motion picture image unless there is exact synchronism with the television presentation and will vary in width with any change in the exposure time per film frame. In any event the appearance of a shutter bar in the film record is objectionable, and it is only with the most precise and expensive equipment that the timing may be controlled with sufficient accuracy to eliminate these effects.

Bearing in mind the foregoing discussion, it is a major object of the present invention to provide a method and apparatus for recording at one frame frequency pictures which are being presented at a different frame frequency.

Another object of the present invention is to provide method and apparatus whereby motion picture recording of television pictures may be accomplished without requiring splicing of television field images.

Still another object of this invention is to provide a method and apparatus for recording television pictures on motion picture film which may be employed without extensive modification of conventional cinematographic equipment.

In accordance with this invention, method and apparatus for recording television pictures on motion picture film are provided whereby the image of television pictures being displayed at a given field frequency is focused upon a motion picture film moved intermittently at a standard frame frequency, the exposure of the film being interrupted during the occurrence of the first, third and fifth fields of each sequence of five successive fields so that splicing of the recorded image does not occur in any frame of the motion picture film.

This invention utilizes the fact that there is more information in a television signal than is actually required to produce satisfactory film recordings which convey an impression of continuous motion. The relatively high field frequency standard for television was chosen because of the problem of flicker, the sensation the eye perceives as a change in the brilliance of the picture due to the repetitive scanning of the presentation. However, the rate required to eliminate flicker is higher by at least a factor of two than the rate required to cause a perception of continuous motion.

These principles are recognized in cinematographic techniques where it is standard practice to project each frame two or three times in order to eliminate flicker. That is, the projection of any one frame is interrupted at least once while the film is stationary and again while the film is pulled down. No equivalent of this operation can be performed in a television system and it is therefore necessary to send a new picture each time a picture is shown. However, since a motion picture film can retain each image for reuse, it is possible to discard some of the excess information in the television presentation to obtain a satisfactory film recording.

The features of this invention which are believed to be novel are set forth with particularity in the appended claims. The invention itself, however, both as to its organization and operation, together with further objects and advantages thereof, may best be understood by reference to the following description taken in connection with the accompanying drawing, in which:

Figure 1:
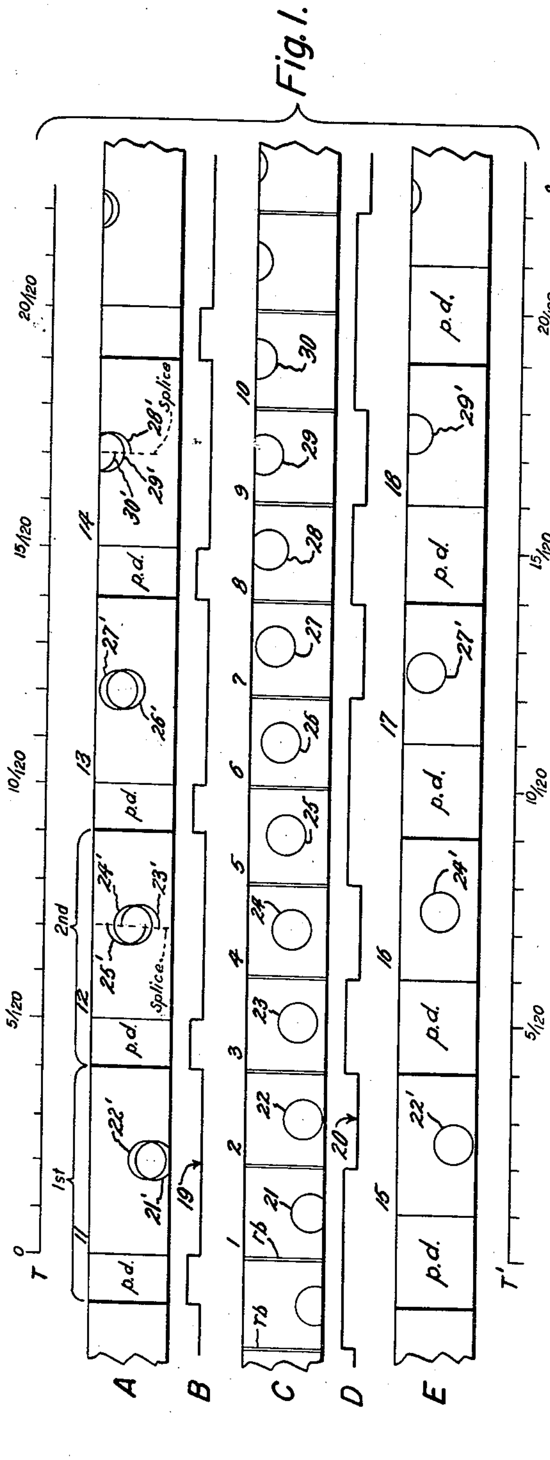
Fig. 1 is a representation of the time relationship between the television presentation and the film recording at standard frequencies and film frame rates.

Fig. 1 illustrates at A and E sequences of successive film frames numbered 11 through 14 and 15 through 18 respectively, which represent photographic records of a sequence C of television fields 1 through 10 as presented on the picture tube of a television receiver. Each unit along the time scales T and T' represents $1/120$ second and lengths parallel to the time scales are representative of the periodicity of the sequences. Dimensions perpendicular to the time scales represent the width of the picture field in each case. At the standard film frame frequency of 24 frames per second each film frame requires $5/120$ second and is equivalent to two and one-half television fields, each requiring $2/120$ second at the standard field frequency of 60 fields per second.

The graphs B and D represent the exposure timing for the film sequences A and E respectively, the film frames being exposed to concurrently appearing television fields during periods defined by the downwardly displaced portions of the graphs, as at 19 and 20. Each of the film frames is illustrated as being divided between pulldown periods *pd* and exposure periods shown pictorially. Pulldown periods are those periods during which exposure is cut off and represent the maximum time available for moving each new film frame into position.

An odd and an even field together with two retrace blanking periods *rb* comprise one television frame. The television picture for this illustration is considered to be swept onto each field in scanning lines perpendicular to the time scales, the first line of each field being at the left in the illustration. The retrace blanking periods *rb* represent the time during which the television receiver is blanked, while the cathode ray spot recycles from the completion of one field to the start of the next.

At 21 through 30 in the television sequence are shown successive positions of a circle moving at a constant speed across the cathode ray tube. Corresponding images in the film sequences are shown at 21' to 30'.

Splices in the photographic image occur whenever a recording method includes partial field scans in the exposure of individual film frames. Film sequence A is illustrative of such a conventional method. In this sequence the dissimilar frame frequencies are rationalized by exposing a first film frame 11 to two television fields, 1 and 2; interrupting the exposure for one-half of the duration of field 3 while pulldown is accomplished; exposing a second film frame 12 to the latter half of field 3, the whole of field 4, and the first half of field 5; and again interrupting exposure for pulldown during the second half of field 5. This exposure sequence is repeated cyclically for every two film frames, the equivalent of five television fields.

According to this method, frame 11 of sequence A records the superimposed images 21' and 22' of the successive positions of the object appearing at 21 and 22 in television fields 1 and 2. Succeeding frame 12 records the portion 23' of the image 23 which was swept into view during the second half of the scan of field 3, the superimposed image 24' of the object at 24 in field 4, and the portion 25' of the image 25 scanned during the first half of field 5. As this cycle is repeated, each film frame is exposed to the equivalent of two television fields and every other frame records a splice at the juncture of two partial scans. If the pulldown period during which exposure is interrupted is not synchronized with the television presentation and shifts to concur with an intermediate portion of a field, a splice will occur in every film frame.

Shutter bar, an objectionable light or dark area, parallel to the scanning lines, appears in the region of the splices unless the pulldown period is exactly equal to one-half field. A light bar in the positive film occurs when there is overexposure due to an overlap of the partial scans, and, conversely, if the sum of the complementary partial scans is less than a whole scan, there is underexposure in the region of the splice which results in a dark bar. Variations in the exposure time will create shutter bars which vary in width. When the ratio of the film frame frequency and the television field frequency is not constant, the shutter bars will move vertically through the film frames.

Film sequence E illustrates film frames exposed in accordance with this invention. It may be seen that each frame is exposed to one integral television field scan. Starting at an arbitrary zero time, exposure is interrupted during television field 1 while pulldown of film frame 1 is completed, allowed during field 2, interrupted during field 3 while pulldown of film frame 2 is accomplished, allowed during frame 4, and interrupted during field 5 while pull-down is again initiated. This exposure cycle is repeated for each sequence of five television frames.

It will be evident that no splice occurs in any film frame. Consequently, the appearance of shutter bar is obviated. Further, the $2/120$ second periods during which exposure is interrupted are longer than the $1/70$ second pulldown time of conventional motion picture cameras and hence, relatively inexpensive equipment is readily adaptable to this method. Since there is some leeway between the allowed and required pulldown periods, control of the synchronization of the film frame rates and the television field rates need not be as rigid or as precise as heretofore required.

This invention is especially applicable where it is desirable for a television studio to make a film recording of a locally produced program by photographing the television scenes as reproduced on a monitor coupled directly to the television cameras. In such a case the apparatus requirements are simplified, synchronization of the photographic and television equipments being automatic since both are driven in phase with the same alternating current input frequency. However, suitable auxiliary equipment may be readily employed when the film camera is driven by an electrical input from a source not synchronized with that supplying the television studio.

The film exposure sequence of this invention may be accomplished either by mechanical modification of the film camera shutter mechanism or by supplying an electrical signal to the cathode ray tube of the television receiver to blank the tube during the periods when exposure is to be interrupted.

Figures 2, 6:
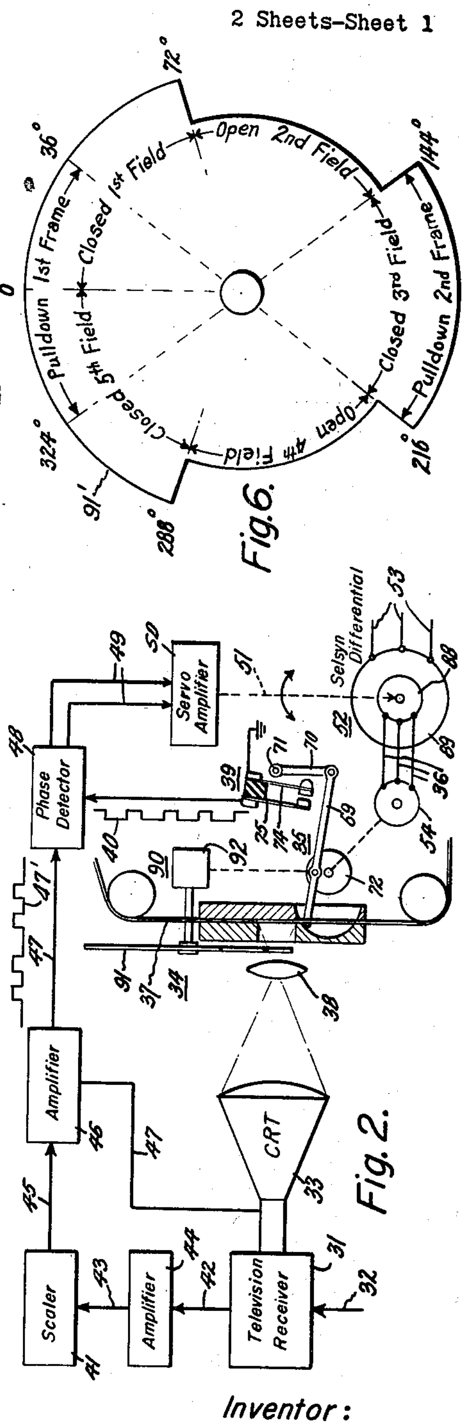
Fig. 2 is an illustration, partly schematic, of apparatus embodying the present invention.
Fig. 6 is an illustration of a shutter design which may be employed in another embodiment of this invention.

Fig. 2 illustrates apparatus which may be employed generally to effect the required exposure sequence by cyclically blanking the television picture presentation. The apparatus comprises a television receiver 31 adapted to receive a picture signal 32 either directly or by remote broadcast and to display television pictures at a field rate of 60 fields per second on a cathode ray tube 33. The motion picture camera 34 shown diagrammatically includes pulldown means 35 responsive to a three phase alternating current input signal 36 to move a motion picture film 37 intermittently at a frame frequency of 24 frames per second, optical means 38 to focus an image of the television pictures upon the film, and a switch means 39 operated by the pulldown means 35 to maintain a pulldown signal 40 during the motion of the film.

Scaler means 41 responsive to a synchronizing signal 43 generated by the television receiver and amplified by a first amplifier 44 produces a blanking signal 45 during the occurrence of the first, third and fifth fields of each sequence of five successive fields of the television picture. This blanking signal 45 is amplified by a second amplifier 46 and the amplified blanking signal 47 is conducted to the cathode ray tube 33 to blank the presentation during corresponding fields.

In applications where television receivers and the motion picture camera both are receiving their input power from the same electrical source, no continuous control of the relative phasing is required. However, in the preferred embodiment of this invention, continual phase correction is provided for by a phase detector means 48 which receives the amplified blanking signal 47' and the pulldown signal 40. The phase detector 48 generates a correction signal 49 whenever film pulldown does not concur with a blanking of the cathode ray tubes. Responsive to such correction signal, a servo amplifier means 50 which has as its output a mechanical rotation 51 controls a selsyn differential means 52. The selsyn differential means is connected in series with the input power line 53 and the synchronous motor drive 54 of the pulldown means 35 to maintain film pulldown in synchronism with the presentation of the television fields.

Figure 3:
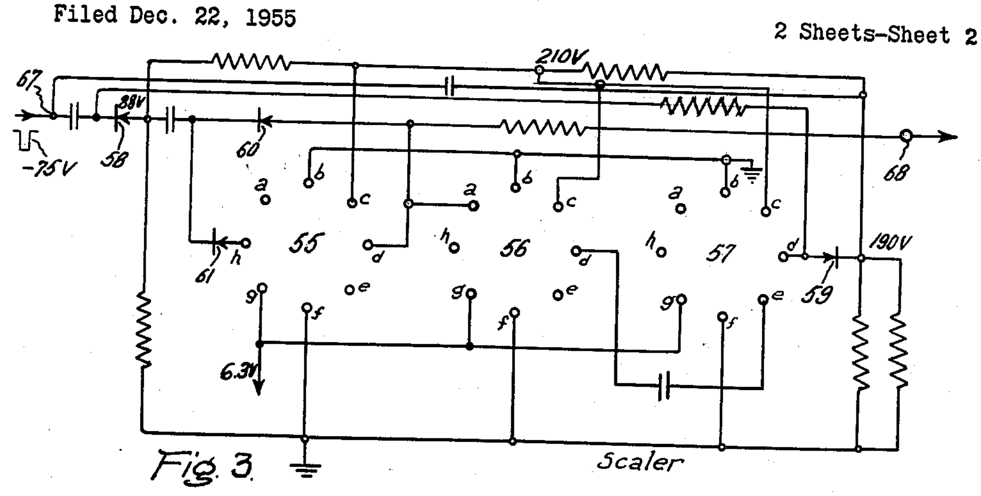
Fig. 3 is a schematic diagram of the scaler means of Fig. 2.

The synchronizing signal 42 may be conveniently obtained from the plate of the vertical sweep output tube of the television receiver 31 and shaped in a conventional manner by a first amplifier 44 into square wave pulses with sharp leading edges and the proper peak-to-peak voltage to operate scaler means 41. The scaler circuit is shown schematically in Fig. 3 as comprising three conventional binary scalers 55, 56, and 57 connected in a loop for feedback operation with crystal rectifiers 58, 59, 60 and 61 for gating. This circuit will be recognized by one skilled in the art as the first three stages of a decade scaler.

Figure 4:
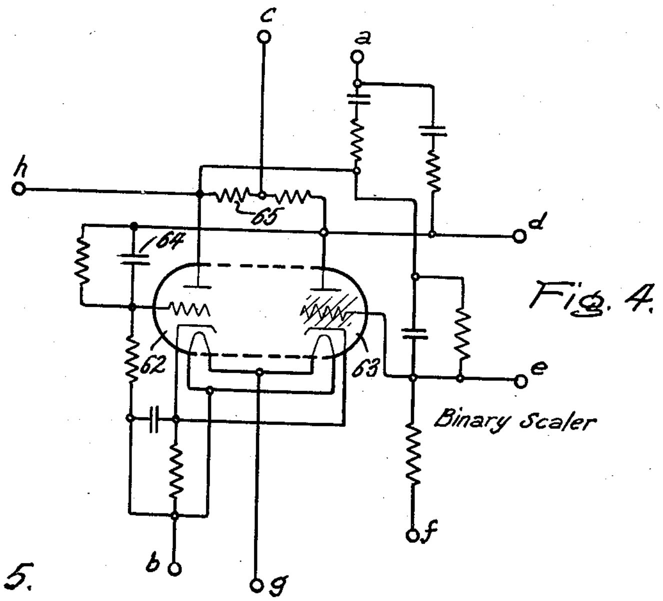
Fig. 4 is a circuit diagram of one of the scaling stages shown in Fig. 3.

Each of the binary scalers 55, 56, and 57 is identical schematically with the circuit of Fig. 4, wherein, by way of example, the commercial binary scaler 4SN1A4 is illustrated. The pins of the octal socket are designated as (*a*) through (*h*), corresponding to their respective connections in the circuit of Fig. 3. The two triodes 62 and 63, halves of a bistable multivibrator such as a 5963 vacuum tube, are alternatively conducting, the voltage at output terminal *d* being 195 volts when triode 62 is conducting and 105 volts when triode 63 is conducting. The circuit is a heavily biased relaxation oscillator with two stable conditions of equilibrium so that the current and voltage values for one of the triodes changes abruptly from one set of values to a second set of values upon reception of a negative triggering pulse. A negative pulse applied to the control grid of triode 63, shown as conducting by shading in the diagram, causes it to assume a more negative potential. The resulting increase in the plate potential of that triode is transferred by the condenser 64 to the control grid of triode 62 making it conducting. This reduces the plate potential of triode 62 due to increased current flow through resistor 65. The decrease in voltage at the plate of triode 62 is transferred by condenser 66 causing triode 63 to be less conducting. This positive feedback action causes the bistable multivibrator to change from triode 63 conducting to triode 62 conducting. A successive negative pulse at pin *a* causes conditions to reverse by the same process, leaving triode 63 conducting.

Referring again to Fig. 3 the sequence of the scaler operation to produce a blanking signal during the first, third and fifth television fields in a recurring cyclic order is similar to that of the first three stages of a conventional decade scaler. The negative synchronizing pulses from the plate of the vertical sweep output tube of the television receiver are shaped into square wave pulses, 75 volts peak-to-peak for this example, by the first amplifier and are applied to the scaler at input terminal 67. During an arbitrarily chosen first television field, triode 63 of each of the binary scalers 55, 56, and 57 is conducting and the output voltage at terminal 68, connected to pin *d* of binary scaler 55, is 105 volts.

The negative input pulse at the beginning of the second television field is not passed by rectifier 59 which behaves as a very high resistance due to voltage across it. The pulse is passed by rectifier 58 to binary scaler 55 which switches from triode 63 conducting to triode 62 conducting so that the output voltage at terminal 68 is 195 volts while this second television field is scanned. Rectifiers 60 and 61 serve to couple the input pulses to the two triodes of binary scaler 55. Binary scalers 56 and 57 are not affected since they are insensitive to the positive potential change at pin *d* of binary scaler 55.

At the start of the third television field the negative input pulse is not passed by rectifier 59 but is passed by rectifier 58 to binary scaler 55 returning it to its original state with triode 63 conducting and triode 62 not conducting. Consequently the output voltage at terminal 68 is again 105 volts during the scan of this third field. Switching of binary scaler 55, however, causes a negative pulse at its pin *d* which switches binary scaler 56. Binary scaler 57 is unaffected as before.

The next negative input pulse at the start of the fourth field as before does not pass rectifier 59 but does pass rectifier 58 so that binary scaler 55 switches to triode 62 conducting and triode 63 not conducting. The voltage at output terminal 68 is then 195 volts during the scan of fourth television field. Binary scalers 56 and 57 are unaffected.

With the start of the fifth field rectifiers 58 and 59 are still in the same condition and binary scaler 55 again switches to triode 63 conducting and triode 62 non-conducting so that the output at terminal 68 is 105 volts during the scan of this field. Binary scaler 55 upon switching has a negative output to binary scaler 56 which returns to its original condition with a negative output to binary scaler 57. Binary scaler 57 switches for the first time to triode 62 conducting and triode 63 not conducting.

Since triode 62 of binary scaler 57 is conducting, the output at its pin *d* is 195 volts rendering rectifier 59 conducting and rectifier 58 non-conducting. Consequently an input pulse at pin 67 at the start of the sixth field (the first in a second sequence of five fields) does not affect binary scalers 55 and 56 but does switch binary scaler 57. All of the binary scalers are then back to their original state with triode 63 conducting and triode 62 non-conducting for each of them. Hence output voltage is again 105 volts. Therefore, the cycle is repeated for successive television fields in sequences of five fields corresponding to two film frames.

The output at terminal 68 of scaler 41 constitutes the blanking signal 45 which is amplified, reversed in phase and applied to the cathode of the cathode ray tube to blank the picture presentation during the first, third and fifth fields of each sequence of five fields. This same signal at 47' in Fig. 2 is compared with the pulldown signal 40 for the generation of the correction signal 49.

Referring again to Fig. 2 a pulldown means 35 by way of example may include a three bar linkage comprising a film engaging finger 69 pivotally secured at one end to a link 70 which rotates about a fixed pin 71. Near the other end the finger is pivotally and eccentrically secured to a gear 72 linked mechanically with the three phase alternating current motor 54 driving the camera. Counter-clockwise rotation of gear 72 causes finger 69 to be moved forward into a perforation in film 37, moved downward pulling a new frame into position for exposure, and then to be retracted during the exposure period.

A simple modification in this type of camera may provide for a pulldown signal during movement of the film. Switch means 39 is located in the camera at a position so that while link 70 is in a forward position during the time finger 69 engages the film, resilient contacts 73 and 74 are closed. At the point in its motion when finger 69 retracts from the film, switch 39 is opened by a sufficient backward motion of link 70. Therefore the switch makes and breaks a circuit between the phase detector 48 and ground in synchronism with the film pulldown.

Figure 5:
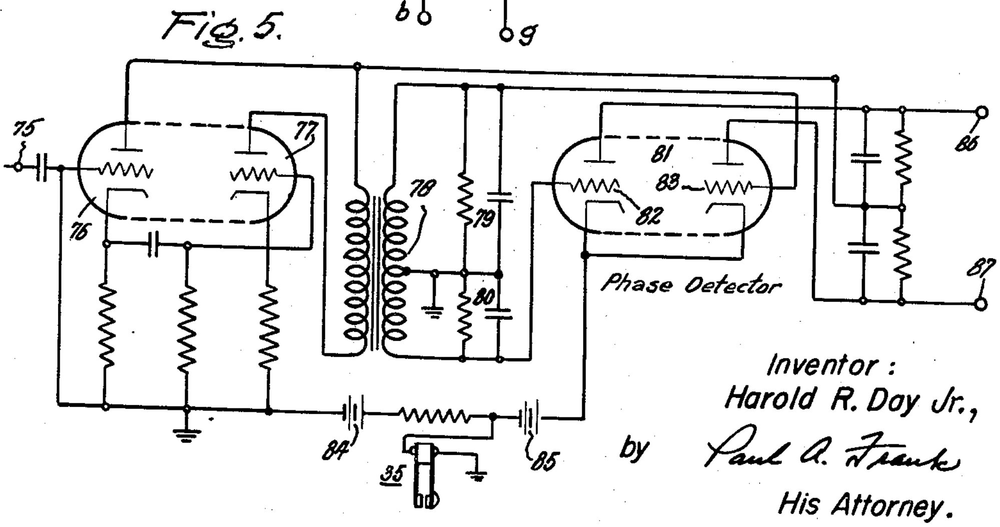
Fig. 5 is a circuit diagram of the phase detector means of Fig. 2.

With reference to Fig. 5, the operation of the phase detector 48 of Fig. 1 follows. The blanking signal is applied as terminal 75.

A first triode 76 functions as a cathode follower for decoupling and a second triode 77 drives a balanced output differentiating transformer 78. Two resistor-condenser networks 79 and 80 are included to lengthen the pulses to the twin triode 81.

Positive pulses appear at grid 82 at the leading edges of the blanking signal pulses and at grid 83 for the trailing edges. However, since the tube is normally biased below cutoff by voltage supplies 84, 85, neither half will conduct. When switch 35, mechanically operated by the pulldown means of the motion picture camera (37 in Fig. 2), is closed, this bias is reduced to a point only slightly below cutoff, since voltage supply 84 is shorted to ground. Hence, coincidence of the closing of switch 35 with a positive pulse appearing at grid 82 or at grid 83 results in an output at terminals 86 and 87 for presentation as a correction signal 49 to the servo amplifier 50 of Fig. 2. When the pulldown of the motion picture film occurs with a blanking of the cathode ray tube the system is synchronized and no correction signal is generated.

Referring again to Fig. 2, any correction signal generated by the phase detector 48 is applied to the servo amplifier 50. The servo amplifier is conventional having as its output the rotation of a small reversible motor, and this output 51 is mechanically linked to the rotor 88 of the selsyn differential 52. The selsyn differential is a motor with three windings on its stator 89 and three windings on its rotor 88. When the rotor is held stationary and three phase voltage is applied to the stator winding, a three phase voltage appears at the terminals of the rotor. However, when the rotor is held at different positions, the output phase will change in proportion to the rotation between positions. Further, if the rotor is rotated at a given frequency, the output voltage has a frequency of the input plus or minus the frequency of the rotation. Therefore, the generation of a correction signal by the phase detector 48 as translated into the rotation of the selsyn rotor 88 by the servo amplifier means 50 results in an increase or decrease of the frequency of the input 36 to the camera motor 54 controlling the pulldown mechanism 35, and this speed change is maintained until the necessary phase shift to synchronize the camera and television receiver has been accomplished. The film pulldown and the field blanking are then occurring simultaneously and no further correction signal is generated by the phase detector. Thus, a continued and intermittent change of phase between the power line and the television signal may be accommodated.

While in the preferred embodiment of this invention means are provided to accommodate continual phase correction, in applications where the film camera and the television camera are operated from synchronized power supplies there is no necessity for a continual correction, and the phase detector and servo amplifier means may be eliminated. The rotor of the selsyn differential may be manually operated to correct for any initial discrepancy in the phasing of the film pulldown mechanism.

While this invention has been shown and described particularly in connection with the cinematographic standard of 24 frames per second and a field frequency standard of 60 fields per second, this invention is not limited to these specific frequencies, but is applicable to the recording on film at other film frame frequencies of cathode ray tube pictures occurring more generally. It should be noted that basically the key to such recording as provided by this invention is that the excessive information in the cathode ray tube pictures is taken advantage of by the intermittent blanking of whole fields so that a constant and integral number of whole fields is photographed for each film frame.

In a further embodiment of this invention, a recording at the standard film frame frequency of 24 frames per second may be made of television pictures being presented at 60 fields per second by a mechanical modification of the conventional film camera. In the camera of Fig. 2 the shutter mechanism 90 comprises a shutter disc 91 driven by a shutter drive 92 linked mechanically to the pulldown mechanism 35. In order that the shutter perform the function of interrupting the film exposure during the first, third, and fifth fields of each sequence of five television fields, the shutter drive 92 is adapted to drive the shutter shaft 93 at 12 revolutions per second and the conventional shutter disc is replaced by one having the configuration illustrated in Fig. 6.

Referring now to Fig. 6 there is shown a shutter disc 91' divided into five sectors of 72 degrees each. The radius of the first sector, from 0 to 72 degrees, of the third from 144 degrees to 216 degrees, and of the fifth from 288 degrees to 0 degrees is such that when the disc is rotated, the passage of light to the film is cut off while these sectors traverse the camera field. The second sector 72 degrees to 144 degrees and the fourth sector 260 degrees to 288 degrees are cut back to allow exposure of the film. It will be apparent that the sector frequency will be:

(5 sectors/second)×(12 revolutions/second) =(60 sectors/second)

which is equivalent to the television field frequency.

Shutter disc 83' may be rotated about the shutter shaft 85 to a relative angular position whereby film pulldown occurs as indicated in Fig. 6 during the times when film exposure is interrupted by a third sector and by the diametrically opposed similar 72 degree portion of the shutter disc from 324 degrees to 36 degrees. Consequently $1/60$ second is available for pulldown. Synchronism of this shutter system with the television presentation so that exposure is interrupted during the first, third and fifth fields of each sequence of five television fields may be accomplished by adjusting selsyn differential means 52 as explained hereinbefore.

While the present invention has been described by reference to particular embodiments thereof, it will be understood that numerous modifications may be made by those skilled in the art without actually departing from the invention. Therefore, it is the aim of the appended claims to cover all such equivalent variations as come within the true spirit and scope of the foregoing disclosure.

What I claim as new and desire to secure by Letters Patent of the United States is:

1. The method of recording television pictures on motion picture film, said method comprising the steps of displaying said pictures at a field frequency of substantially 60 fields per second; intermittently accomplishing pulldown of said film at a frame frequency of substantially 24 frames per second, exposing said film to an image of said pictures, and suspending the exposure of said film during the total time of the occurrence of the first, third, and fifth fields of each sequence of five successive fields of said pictures.

2. The method of recording television pictures on motion picture film, said method comprising the steps of displaying said pictures on a cathode ray tube at a field frequency of substantially 60 fields per second, intermittently accomplishing pulldown of said film at a frame frequency of substantially 24 frames per second, exposing said film to an image of said pictures, suspending the exposure of said film during the total time of the occurrence of the first, third, and fifth fields of each sequence of five successive fields of said television pictures, and adjusting the timing of said pulldown to concur with a suspension in the exposure of said film.

3. The method of recording television pictures on motion picture film, said method comprising the steps of displaying said pictures on a cathode ray tube at a field frequency of substantially 60 fields per second; intermittently accomplishing pulldown of said film at a frame frequency of substantially 24 frames per second; focusing on said film an image of said television pictures; blanking said cathode ray tube during the total time of the occurrence of the first, third, and fifth fields of each sequence of five successive fields of said television pictures; generating a correction signal in response to any non-concurrence of said pulldown and said blanking; and varying the frequency of said pulldown in accordance with said correction signal to adjust the timing of said pulldown to concur with the blanking of said cathode ray tube.

4. A method of recording television pictures on motion picture film which comprises the steps displaying said pictures at a field frequency of 60 fields per second with successive fields containing respectively the odd and even lines of an interlace scan, intermittently accomplishing pull-down of said film at a frame frequency of 24 frames per second, exposing said film to an image of said fields and blanking the exposure of said film for the duration of the first, third and fifth fields of each sequence of five successive fields and timing the pull-down periods to be centered at the center of the third field and the point of time between said fifth and first fields whereby two fields of even lines of the interlace scan are recorded during one sequence of five fields and two fields of odd lines of the interlace scan are recorded during the successive sequence of five fields.

5. A method of recording television pictures on motion picture film which comprises the steps displaying said pictures at a field frequency of 60 fields per second with successive fields containing respectively the odd and even lines of an interlace scan, exposing said film to an image of said fields, blanking the exposure of said film for the duration of the first, third and fifth fields of each sequence of five successive fields, intermittently accomplishing pull-down of said film at a frame frequency of 24 frames per second and timing the pull-down periods to be centered at the center of the third field and the point of time between said fifth and first fields.

References Cited in the file of this patent

UNITED STATES PATENTS

| | | |
|---|---|---|
| 2,251,786 | Epstein | Aug. 5, 1941 |
| 2,604,535 | Garman et al. | July 22, 1952 |

FOREIGN PATENTS

| | | |
|---|---|---|
| 694,005 | Great Britain | July 8, 1953 |
| 722,962 | Great Britain | Feb. 2, 1955 |